United States Patent
Choi et al.

(10) Patent No.: US 11,341,375 B2
(45) Date of Patent: *May 24, 2022

(54) IMAGE PROCESSING APPARATUS AND METHOD BASED ON DEEP LEARNING AND NEURAL NETWORK LEARNING

(71) Applicant: Samsung Electronics Co., Ltd., Suwon-si (KR)

(72) Inventors: Hyun Jin Choi, Seoul (KR); Chang Hyun Kim, Seongnam-si (KR); Eun Soo Shim, Suwon-si (KR); Dong Hwa Lee, Hwaseong-si (KR); Ki Hwan Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,455

(22) Filed: Nov. 14, 2019

(65) Prior Publication Data

US 2020/0090008 A1 Mar. 19, 2020

Related U.S. Application Data

(63) Continuation of application No. 15/271,476, filed on Sep. 21, 2016, now Pat. No. 10,489,684.

(30) Foreign Application Priority Data

Dec. 14, 2015 (KR) .................... 10-2015-0178567

(51) Int. Cl.
*G06K 9/62* (2022.01)
*G06K 9/66* (2006.01)
(Continued)

(52) U.S. Cl.
CPC ......... *G06K 9/6267* (2013.01); *G06K 9/4604* (2013.01); *G06K 9/52* (2013.01); *G06K 9/66* (2013.01)

(58) Field of Classification Search
CPC .......... G06K 9/6267; G06K 9/66; G06K 9/52; G06K 9/4604
See application file for complete search history.

(56) References Cited

U.S. PATENT DOCUMENTS 6,738,500 B2 5/2004 Bankman et al.
7,545,965 B2 6/2009 Suzuki et al.
(Continued)

FOREIGN PATENT DOCUMENTS

JP 2005-190400 A 7/2005
JP 4171806 B2 8/2008
(Continued)

OTHER PUBLICATIONS

Noh, Hyeonwoo, Seunghoon Hong, and Bohyung Han. "Learning deconvolution network for semantic segmentation." Proceedings of the IEEE international conference on computer vision. 2015. (Year: 2015).*

(Continued)

*Primary Examiner* — Andrae S Allison
(74) *Attorney, Agent, or Firm* — NSIP Law

(57) ABSTRACT

Apparatuses and methods for image processing are provided. The image processing apparatus performs area classification and object detection in an image, and includes a feature map generator configured to generate the feature map of the input image using the neural network, and an image processor configured to classify the areas and to detect the objects in the image using the generated feature map.

18 Claims, 8 Drawing Sheets

(51) Int. Cl.
*G06K 9/52* (2006.01)
*G06K 9/46* (2006.01)

(56) References Cited

U.S. PATENT DOCUMENTS

| | | | |
|---|---|---|---|
| 8,861,842 | B2 | 10/2014 | Jung et al. |
| 9,008,423 | B2 | 4/2015 | Cho et al. |
| 9,183,459 | B1 * | 11/2015 | Zhang ................. G06K 9/6293 |
| 2005/0139782 | A1 | 6/2005 | Nagahashi et al. |
| 2011/0255741 | A1 | 10/2011 | Jung et al. |
| 2014/0177946 | A1 * | 6/2014 | Lim ................... G06K 9/00369 382/156 |
| 2015/0248591 | A1 * | 9/2015 | Shi ........................ G06K 9/20 382/195 |
| 2016/0055237 | A1 * | 2/2016 | Tuzel ................... G06K 9/6282 382/224 |
| 2016/0358337 | A1 * | 12/2016 | Dai ........................ G06T 7/11 |
| 2019/0130191 | A1 * | 5/2019 | Zhou .................... G06K 9/4604 |

FOREIGN PATENT DOCUMENTS

| | | |
|---|---|---|
| KR | 10-0237875 B1 | 1/2000 |
| KR | 10-2011-0037183 A | 4/2011 |
| KR | 10-2011-0037184 A | 4/2011 |
| KR | 10-1261409 B1 | 5/2013 |
| KR | 10-2014-0081254 A | 7/2014 |

OTHER PUBLICATIONS

Zitnick, C. Lawrence, and Piotr Dollár. "Edge boxes: Locating object proposals from edges." European conference on computer vision. Springer, Cham, 2014. (Year: 2014).*
Jian Dong, et al., "Toward Unified Object Detection and Semantic Segmentation." Computer Vision—ECCV2014, Sep. 2014, vol. 8693 p. 299-314 (16 pages in English).
Bharath Hariharan, et al., "Simultaneous Detection and Segmentation." Computer Vision—ECCV2014, Sep. 2014, vol. 8695 p. 297-312 (16 pages in English).
Jonathan Long, et al.,"Fully Convolutional Networks for Semantic Segmentation." CVPR 2015, Nov. 2014 (10 pages in English).
Shaoqing Ren, et al.,"Faster R-CNN:Towards Real-Time Object Detection with Region Proposal Networks." arXiv.org, arXiv:1506.01497, Jun. 2015 (14 pages in English).

* cited by examiner

IMAGE PROCESSING APPARATUS AND METHOD BASED ON DEEP LEARNING AND NEURAL NETWORK LEARNING

CROSS-REFERENCE TO RELATED APPLICATION(S)

This application is a continuation of U.S. patent application Ser. No. 15/271,476 filed on Sep. 21, 2016 which claims the benefit under 35 USC § 119(a) of Korean Patent Application No. 10-2015-0178567 filed on Dec. 14, 2015, in the Korean Intellectual Property Office, the entire disclosures of which is incorporated herein by reference for all purposes.

BACKGROUND

1. Field

The following description relates to an image processing technique of detecting objects and classifying image areas, and a neural network learning apparatus that processes image.

2. Description of Related Art

There are various computer-based visual image processing techniques. Object detection and area (region) classification using pixel labeling are two examples of techniques used for computer-based image processing. Engineer-designed features may be used with these techniques to recognize objects in an image. However, with recent technological development in the field of deep learning, an object detection technique and a pixel labeling technique using a convolution neural network (CNN) are considered as potential independent methods for object detection and image area classification. In particular, a method known as a faster region-based convolution neural network (faster R-CNN) is proposed for object detection. Faster R-CNN technique involves generating a bounding box using convolution layers and then applying a classifier thereto to detect objects. A method of fully convolutional networks for semantic segmentation, which uses only convolution layers, has been separately proposed for area classification.

Object detection techniques and image area classification techniques are independently performed in this manner and their results are merged in the final stage. Accordingly, features for the object detection and features for the area classification have been often extracted separately.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, there is provided an apparatus for classifying areas and detecting objects in an image, the apparatus including a processor configured to generate a feature map of an input image using a neural network, and classify the areas and detect the objects in the image using the generated feature map.

The processor may include a feature map generator configured to generate the feature map of the input image using the neural network, and an image processor configured to classify the areas and to detect the objects in the image using the generated feature map.

The neural network may include a convolution neural network.

The image processor may include an area classifier configured to perform pixel labeling on the generated feature map, and classify classes by the areas on the basis of the pixel labeling.

A result of pixel labeling may include pixel probability distribution information of the classes to be classified, and the area classifier may be configured to classify the classes by the areas using a class having a maximum probability for each pixel in the pixel probability distribution information.

The image processor may include an object detector configured to reinforce the feature map on the basis of a result of the pixel labeling and to detect an object in the image using the reinforced feature map.

The area classifier may be configured to perform the pixel labeling in one or more stages using deconvolution or backward convolution, and the object detector may be configured to receive a result of the pixel labeling by stages and to reinforce the feature map.

The object detector may be configured to adjust the feature map subjected to the pixel labeling by the area classifier and the feature map generated by the feature map generator to have the same resolution, and to concatenate both feature maps to generate a reinforced feature map.

The object detector may be configured to predict a bounding box using the reinforced feature map and to classify classes by objects in the image using a result of the bounding box prediction.

The object detector may be configured to perform box regression analysis using box coordinates in the result of the bounding box prediction and to determine whether to use the bounding box based on a confidence score of the result of the bounding box prediction.

The object detector may be configured to classify object classes for the bounding box using information of the area classes classified by the area classifier.

The area classifier may be configured to perform the pixel labeling on the basis of the result in which object classes in the image are classified by the object detector and the generated feature map.

In another general aspect, there is provided a method of classifying areas and detecting objects in an image, the method including generating a feature map of an input image using a neural network, and classifying the areas and detecting the objects in the image using the generated feature map.

The neural network may include a convolution neural network.

The performing of the classifying of the areas and the detecting of the objects may include performing pixel labeling on the generated feature map and classifying classes by the areas on the basis of the pixel labeling.

A result of the pixel labeling may include pixel probability distribution information of the classes to be classified, and the classifying of the classes by the areas may include classifying the classes by the areas using a class having a maximum probability for each pixel in the pixel probability distribution information.

The method according to claim 16, wherein the classifying of the areas and the detecting of the object in the image further comprises reinforcing the feature map on the basis of a result of the pixel labeling and detecting an object in the image using the reinforced feature map.

The classifying of the classes by areas may include performing the pixel labeling in one or more stages using deconvolution or backward convolution, and the detecting of an object in the image may include receiving a result of the pixel labeling by stages and reinforcing the feature map.

The detecting of an object in the image may include adjusting the reinforced feature map and the feature map to have the same resolution and concatenating both feature maps to generate the reinforced feature map.

The detecting of an object in the image may include predicting a bounding box using the reinforced feature map and classifying classes by objects in the image using a result of the bounding box prediction.

The detecting of an object in the image may include performing box regression analysis using box coordinates in result of the bounding box prediction and determining whether to use the bounding box based on a confidence score of the result of in the bounding box prediction.

The feature map may include one or more of color of the input image, shape of the input image, areas of the input image, outline of the input image, and luminous intensity of the input image.

In another general aspect, there is provided a neural network learning apparatus for classifying areas and detecting objects in an image, the apparatus including a feature map generator configured to generate a feature map of the image using a neural network, an image processor configured to classify the areas and to detect the objects in the image using the generated feature map, and a neural network learner configured to cause the neural network to learn the area classification using a result of the classifying of the areas and a first measured value and to cause the neural network to learn the object detection using a result of the detecting of the object and a second measured value.

The image processor may include an object detector configured to classify areas in the image by performing pixel labeling on the basis of the feature map, to reinforce the feature map on the basis of the pixel labeling result, and to detect an object in the image on the basis of the reinforced feature map.

The neural network learner may be configured to define an area classification loss function and an object detection loss function and to train the neural network in an integrated learning manner using a learning algorithm on the basis of the area classification loss function and the object detection loss function, and the feature map generator may be configured to generate the feature map in consideration of a correlation between features required for the area classification and the object detection using the neural network trained in the integrated learning manner.

In another general aspect, there is provided a method of classifying areas and detecting objects in an image, the method including generating a feature map of an input image using a neural network, and performing pixel labeling to generate pixel probability distribution information of the classes to be classified, reinforcing the feature map based on the pixel labeling, estimating a bounding box based on the reinforced feature map, classifying classes by the areas based on the pixel probability distribution information, determining a confidence score based on coordinates of the bounding box, and detecting the objects from the input image, in response to the confidence score being greater than a threshold.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
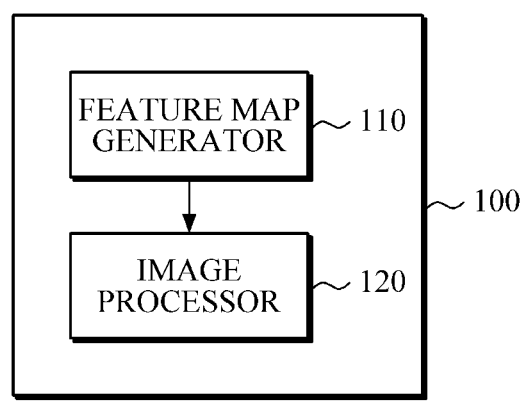
FIG. 1 is a diagram of an example of an image processing apparatus.

FIG. 1 is a diagram illustrating an example of an image processing apparatus.

Referring to FIG. 1, the image processing apparatus 100 includes a feature map generator 110 and an image processor 120.

Using a neural network, the feature map generator 110 generates a feature map of an input image. According to an example, the feature map is a map including significant information in the input image such as, for example, outline, luminous intensity, and object shape in an image. For example, when the input image has RGB color channels, the input image can be changed in grayscale to generate a feature map in which information of luminous intensity and outline have been emphasized.

In an example, the feature map generator 110 generates a feature map using a convolution neural network (CNN). The convolution neural network may include a plurality of convolution layers from which a convolution feature can be extracted, and the feature map generator 110 can use a result obtained by applying the convolution layers to an image as a feature map. In an example, the feature map includes information such as shape, luminous intensity, outline, and color in the image according to a convolution kernel, and the resolution of the feature map may be set to be different from that of the input image.

The feature map generator 110 can generate a feature map having a lower resolution and more channels than those of the input image. For example, when a feature map is generated using a convolution neural network (CNN), a feature map having a resolution of 16 by 16 can be generated by applying a convolution layer using 5 by 5 convolution kernels in an image having a resolution of 20 by 20. In an example, a plurality of convolution layers can be used in consideration of system performance or a keypoint of the input image.

The image processor 120 can classify areas or regions of an image and detect an object by using the feature map in the process of classifying areas in the input image and the process of detecting an object. The use of a feature map refers to feature maps required for object detection and area classification that are not independently generated and used in the processes from the input image, but one feature map generated by the feature map generator 110 is used in the processes and intermediate results or the final result of the area classification or the object detection is used.

In an example, the image processor 120 may generate a reinforced feature map using a feature map including image information having a correlation such as outline and luminous intensity of the image, which is required for the process of classifying areas of an image and the process of detecting an object. In an example, the image processor 120 classifies areas and detects an object using the reinforced feature map.

The use of a feature map in the area classification and the object detection and the generation of a reinforced feature map will be described with reference to FIG. 2.

Figure 2:
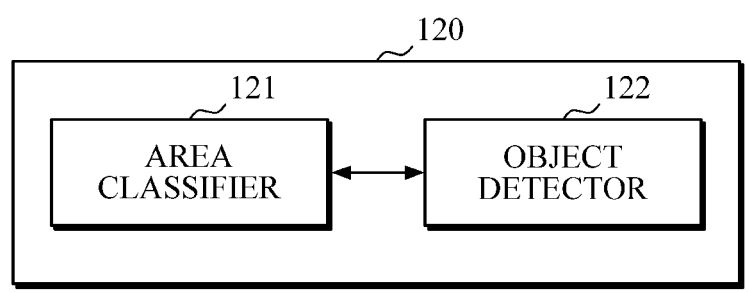
FIG. 2 is a diagram illustrating an example of an image processor according to an image processing apparatus illustrated in FIG. 1.

FIG. 2 is a diagram illustrating an example of an image processor 120 according to the apparatus illustrated in FIG. 1. Referring to FIG. 2, the image processor 120 includes an area classifier 121 and an object detector 122.

The area classifier 121 performs pixel labeling on the basis of the generated feature map. In an example, the area classifier 121 receives a feature map and perform the pixel labeling using deconvolution or backward convolution. Pixel labeling refers to the same label being attached to neighboring pixels having a similar feature in an input image and different labels being attached to pixels having different features. The feature is significant information that can be used to classify areas of the input image, such as information of luminous intensity and outline of an image, but the present disclosure is not limited thereto. The labels may be predefined different values corresponding to classes by areas to be classified. A class of an area refers to a group of pixels having the same label on the basis of the pixel labeling in the input image.

In an example, the pixel labeling result includes pixel probability distribution information for classes by areas to be classified in an image. For example, when the classes by areas which can be classified in an input image are area 1, area 2, area 3, and area 4, the area classifier 121 can calculate probabilities that each pixel corresponds to area 1, area 2, area 3, and area 4, determine the area having the maximum probability in the pixel, and assign a label to the area. When the probabilities that a pixel A in an input image corresponds to area 1, area, 2, area 3, and area 4 are 5%, 20%, 35%, and 75%, respectively, the area classifier 121 can perform pixel labeling by determining that the pixel A corresponds to area 4 and assigning label 4 to the pixel. The resolution of the pixel probability distribution information may be equal to the resolution of the input image and the number of channels may be equal to the number of classes of the entire areas of the image.

After performing the pixel labeling, the area classifier 121 classifies areas depending on the classes in the input image using the result of pixel labeling.

The area classifier 121 can perform the pixel labeling one time or more by stages. When the pixel labeling is performed multiple times, the area classifier 121 can provide the results of the stages as sub feature maps to the object detector 122. In an example, the object detector 122 can receive the pixel labeling result generated for each stage of the pixel labeling from the area classifier 121 and reinforce the feature map. For example, the feature map generator 110 can generate a feature map having a resolution other than that of the input image using a convolution neural network, and area classifier 121 can obtain the pixel labeling result having the same resolution as the input image using deconvolution. The object detector 122 may receive the pixel labeling result using one time of deconvolution, may receive the pixel labeling results of a plurality of deconvolution stages by stages when the feature map is generated using a plurality of convolution layers, and may receive the intermediate results by stages and reinforce the feature map when the deconvolution includes a plurality of processing stages. The above-mentioned embodiment is only an example and the present disclosure is not limited thereto.

The object detector 122 can reinforce the feature map on the basis of the pixel labeling result of the area classifier 121 and detect an object in the image using the reinforced feature map. For example, the feature map generated using a convolution neural network by the feature map generator 110 may have a resolution different from the resolution of the input image, and the object detector 122 can adjust the resolution of the feature map to the same resolution as the result of the pixel labeling. In an example, the object detector 122 matches the feature map having the resolution adjusted and the pixel labeling result for each pixel for concatenation. The object detector 122 reflects area information, which is classified depending on classes of the image in the first generated feature map and reinforces the feature map.

In an example, when a similar feature is not present between neighboring pixels in the result of pixel labeling by the area classifier 121, different labels are assigned to the pixels to classify area classes. Thus, the result of pixel labeling may be included in the outline information of the input image. The object detector 122 can concatenate the pixel labeling result to the outline information of the feature map generated by the feature map generator 110 to generate a feature map in which the outline information in the input image is reinforced.

The object detector 122 may reinforce the feature map using the pixel labeling result including the pixel probability distribution information. In an example, the object detector 122 reinforces the feature map by defining pixel information having probability values of a specific area of the image in the pixel probability distribution information as a new feature of the image, adjusting the resolution of the feature map generated by the feature map generator 110 to the same resolution as the result of the pixel labeling, and matching and concatenating the pixel labeling result including the pixel probability distribution information to the feature map for each pixel.

In an example, the object detector 122 predicts a bounding box using the reinforced feature map. For example, the object detector 122 predicts coordinates of an area classified in the image as coordinates at which an object is located using the reinforced feature map including coordinates of classes by areas of the input image. In an example, the object detector 122 can generate a bounding box including the predicted coordinates of an object. The bounding box may be a rectangular shape surrounding the periphery of the predicted object, but the present disclosure is not limited thereto. Other shapes of the bounding box, such as, for example, circular or polygon, may be used without departing from the spirit and scope of the illustrative examples described.

In another example, the area classifier 121 can be supplied with a result in which classes are classified for each object in the image from the object detector 122, reinforce the feature map using the feature map generated by the feature map generator 110, and perform the pixel labeling on the basis of the reinforced feature map. In an example, the area classifier 121 defines the object coordinates of the image detected by the object detector 122 as a new feature of the image and reinforce the feature map on the basis of the feature map generated by the feature map generator 110. The area classifier 121 determines object coordinates as different area classes in classifying areas of the input image using the reinforced feature map including the object coordinates detected in the image at the time of performing the pixel labeling. The object classes refer to different objects.

In an example, the object detector 122 determines whether to use the bounding box on the basis of coordinates of the predicted bounding box and confidence scores. For example, the object detector 122 may perform regression analysis on the coordinate of a specific position in the image or the coordinate of a specific bounding box and the coordinate of the predicted bounding box to determine a confidence score. The object detector 122 may determine whether to use the bounding box by comparing the confidence score with a threshold value, which is set on the basis of a criterion. In an example, the threshold value and the criterion is predetermined. For example, when a correlation coefficient in the regression analysis is used as the confidence score, it may be determined whether to appropriately use the predicted bounding box by setting a threshold value depending on a system to which the image processing apparatus 100 is applied, and it may be determined whether to use the predicted bounding box.

For example, when an image processing speed is more important than accuracy of the area classification and the object detection of an input image, the image processing speed can be increased by lowering the determination criterion of the confidence score and setting the threshold value to be lower. When the accuracy of the area classification and the object detection is more important than the image processing speed, the determination criterion of the confidence score can be set to be higher and the threshold value can be set to be higher. The present disclosure is not limited to this configuration, but the predicted bounding box may be immediately determined to be used.

In an example, the confidence score and the threshold value may be determined on the basis of the coordinate of the predicted bounding box, the feature map generated by the feature map generator 110, the reinforced feature map generated by the object detector 122. In another example, the confidence score may be determined in accordance with system setting of a user or an operator, or the determination criterion of the confidence score may be periodically updated through wired or wireless networks depending on complexity of an input image. The coordinate of the bounding box may include the coordinates of the corners of each bounding box, but the present disclosure is not limited thereto. The coordinate of the bounding box may be set in consideration of system specifications of an image processing apparatus.

When the predicted bounding boxes overlap each other, the object detector 122 can merge the overlapped bounding boxes and consider the merged bounding box as a bounding box surrounding a single object. The object detector 122 may use the coordinate of the bounding box surrounding a single object in the overlapped bounding boxes as the coordinate of the merged bounding box. The class of the object in the overlapped bounding boxes can be classified based on the result of pixel labeling of the area classifier 121, without assigning a classifier to the bounding box surrounding the individual object.

Even when a particular classifier is not assigned to the individual object in the overlapped bounding boxes, different labels may be assigned to the individual objects in the overlapped bounding boxes in the pixel labeling result of the area classifier 121, and the object detector 122 can identify the individual objects in the merged bounding box using the classes of the individual objects in the overlapped bounding boxes using the pixel labeling result generated by the area classifier 121.

Figure 3:
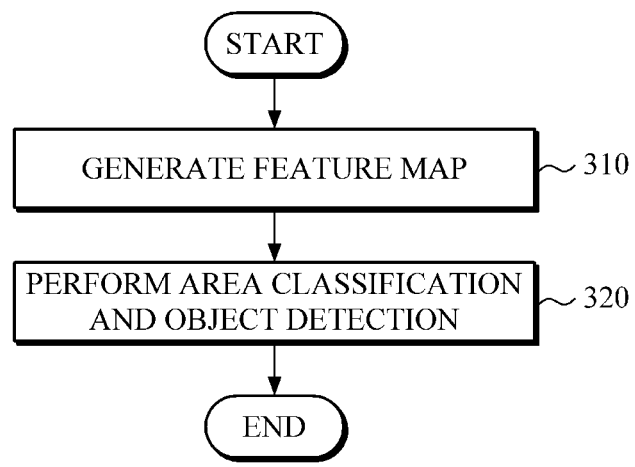
FIG. 3 is a diagram illustrating an example of an image processing method.

FIG. 3 is a diagram illustrating an example of an image processing method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. In addition to the description of FIG. 3 below, the above descriptions of FIGS. 1-2, are also applicable to FIG. 3, and are incorporated herein by reference. Thus, the above description may not be repeated here. FIG. 3 illustrates an example of the image processing method, which is performed by the image processing apparatus 100 illustrated in FIG. 1.

Referring to FIGS. 1 and 3, in S310, the image processing apparatus 100 generates a feature map of an input image using a neural network. The feature map may include information, which is significant in classifying areas and detecting objects in an image, such as, for example, luminous intensity, color, and outline in an image.

A convolution neural network (CNN) may be used to generate a feature map, but the present disclosure is not limited thereto. Other types of neural network, such as, for example, deep neural network (DNN) or recurrent neural network (RNN), may be used without departing from the spirit and scope of the illustrative examples described. In an example, the type of neural network used may depend on the usage of the image processing apparatus 100.

For example, the image processing apparatus 100 can generate a feature map using a convolution neural network having a plurality of convolution layers. In an example, the image processing apparatus 100 generates a feature map having a lower resolution and more channels than those of the input image. For example, when a feature map is generated using the convolution neural network, a feature map having a resolution of 16 by 16 can be generated by applying a convolution layer using 5 by 5 convolution kernels in an image having a resolution of 20 by 20, and numerous convolution layers can be used in consideration of system performance or a keypoint of the input image.

In S320, when the feature map is generated, the image processing apparatus 100 uses the generated feature map in the area classification step and the object detection step to classify areas and to detect objects. The image processing apparatus 100 can perform the pixel labeling using the generated feature map to classify areas of the image.

For example, the image processing apparatus 100 generates a feature map using a convolution neural network having a plurality of convolution layers, and the image processing apparatus 100 can perform the pixel labeling using deconvolution in the area classification step. The pixel labeling can be performed by assigning the same label to neighboring pixels having a similar feature in the input image. The pixel labeling result may include pixel probability distribution information for the classes to be classified in the image.

In an example, the image processing apparatus 100 classifies classes by areas in an input image using the result of pixel labeling. A group of pixels having the same label after the pixel labeling has been performed can be defined as a single area class to classify the areas by classes in the input image. In an example, the image processing apparatus 100 can reinforce the feature map using the pixel labeling result generated in the area classification step. Further details of the reinforcing of the feature map in the object detection step will be described with reference to FIGS. 4A to 4C.

The image processing apparatus 100 can predict a bounding box using the reinforced feature map. For example, the image processing apparatus 100 can predict the coordinate of an object in the image using the reinforced feature map including the pixel labeling result of the input image and can generate a bounding box including the predicted coordinate of the object. Here, the bounding box may have a rectangular shape surrounding the periphery of the predicted object, but the present disclosure is not limited thereto. Other shapes of the bounding box, such as, for example, circular or polygon, may be used without departing from the spirit and scope of the illustrative examples described.

After the coordinate of the bounding box is predicted, the image processing apparatus 100 determines whether to use the predicted bounding box. For example, the image processing apparatus 100 generates a confidence score, determine that the predicted bounding box includes an object when the generated confidence score is greater than a threshold value determined on the basis of a predetermined criterion, and determine to use the bounding box. The confidence score can be determined by performing regression analysis on the coordinate of a predetermined position in the image or the coordinate of a specific bounding box and the coordinate of the predicted bounding box. In an example, a correlation coefficient determined based on the regression analysis is determined to be the confidence score. The threshold value can be determined depending on the system to which the image processing apparatus 100 is applied and the usage of the system. It can be determined whether to appropriately use the predicted bounding box by comparing the determined threshold value with the confidence score.

When it is determined that the confidence scores of the predicted bounding boxes exceeds the threshold value and it is determined to use the predicted bounding boxes, but the predicted bounding boxes overlap each other, the image processing apparatus 100 can perform merging.

When the predicted bounding boxes overlap each other, the image processing apparatus 100 can merge the overlapped bounding boxes and consider the merged bounding box as a bounding box surrounding a single object. The image processing apparatus 100 uses the coordinates of the bounding boxes surrounding individual objects in the overlapped bounding boxes as the coordinates of the merged bounding box and classifies classes of the objects in the overlapped bounding boxes on the basis of the pixel labeling, without assigning particular classifiers to the bounding boxes surrounding the individual objects.

Even when particular classifiers are not assigned to the individual objects in the overlapped bounding boxes, the classes in the pixel labeling result in the area classification step may be classified using different labels for the individual objects in the overlapped bounding boxes. In the object detection step, the individual objects in the overlapped bounding boxes can be classified on the basis of the pixel labeling result in the area classification step for the individual objects in the merged bounding boxes.

Figure 4A:
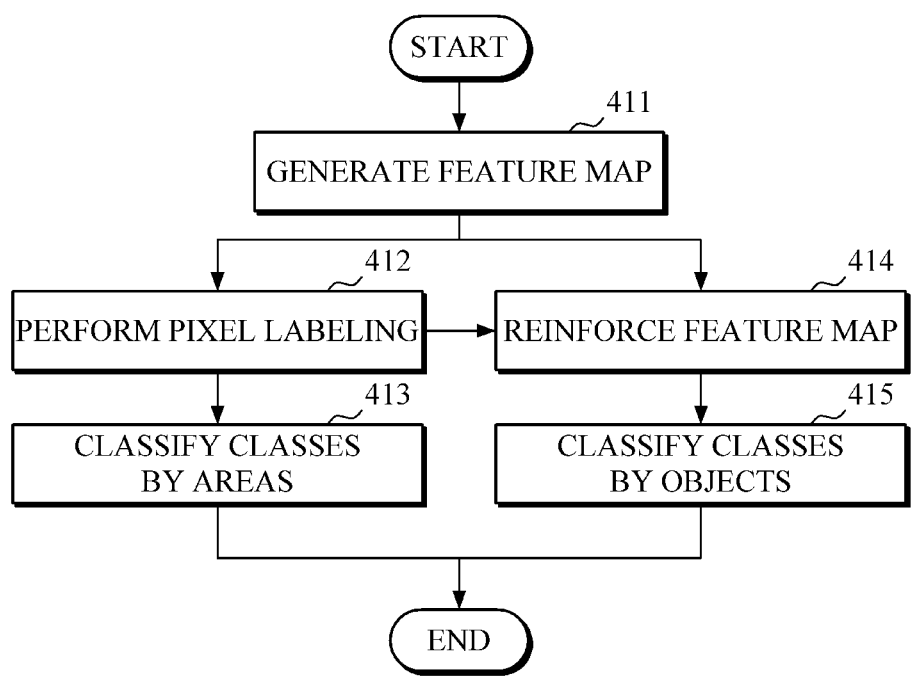
FIGS. 4A to 4C are diagrams illustrating additional examples of image processing methods.
Figure 4B:
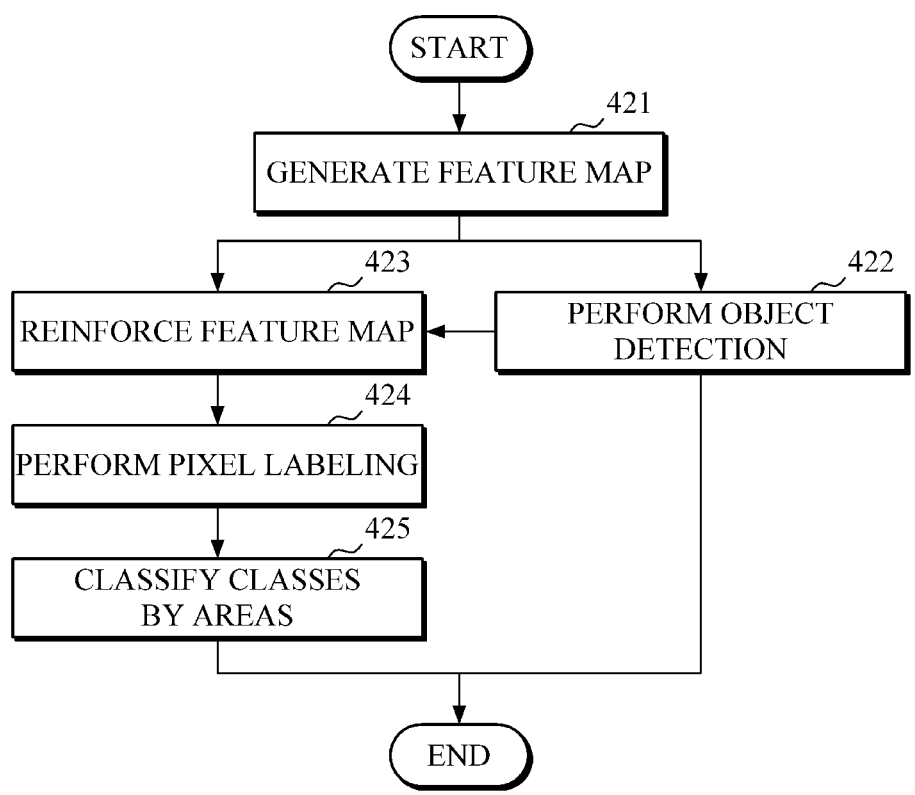
Figure 4C:
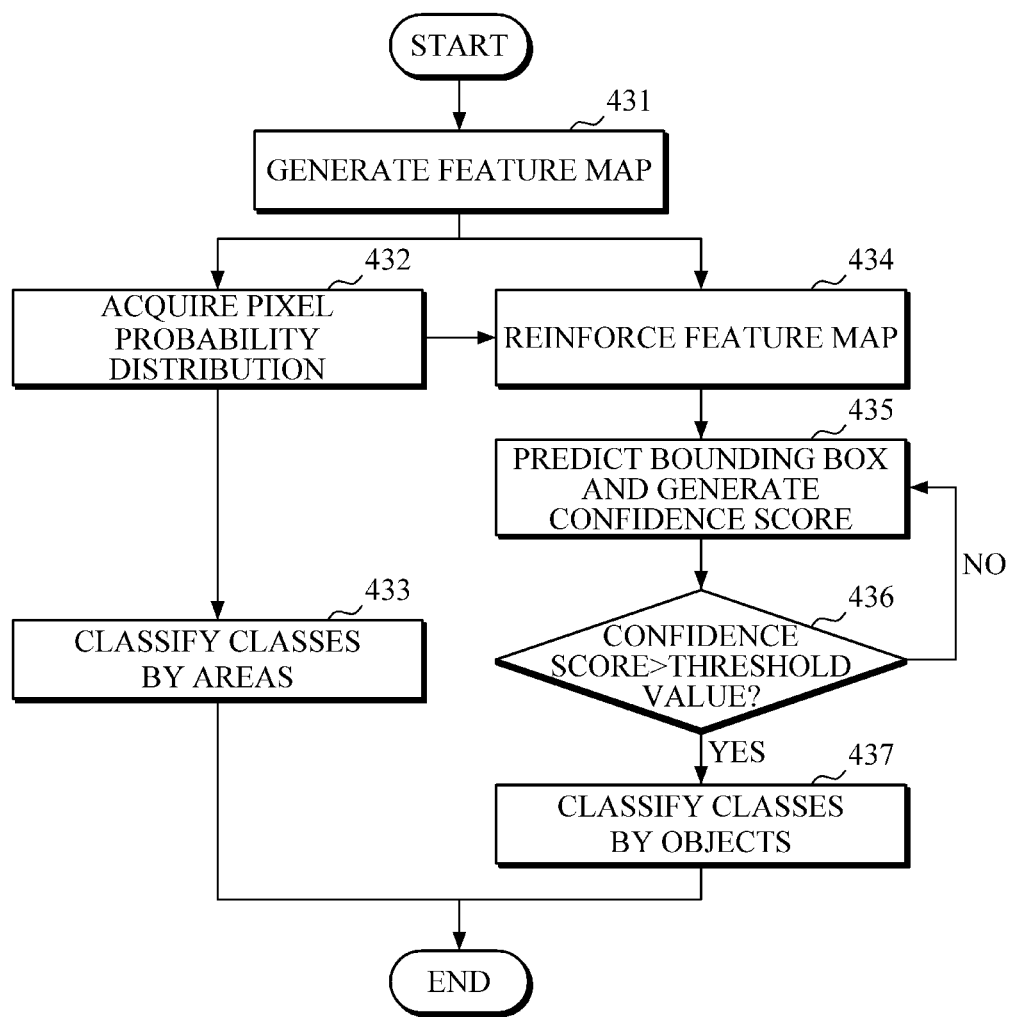

FIGS. 4A to 4C are diagrams illustrating examples of image processing methods. The operations in FIGS. 4A to 4C may be performed in the sequence and manner as shown, although the order of some operations may be changed or some of the operations omitted without departing from the spirit and scope of the illustrative examples described. Many of the operations shown in FIGS. 4A to 4C may be performed in parallel or concurrently. In addition to the description of FIGS. 4A to 4C below, the above descriptions of FIGS. 1-3, are also applicable to FIGS. 4A to 4C, and are incorporated herein by reference. Thus, the above description may not be repeated here.

FIG. 4A illustrates an example of an object detection method using the pixel labeling result in the area classification process to detect an object.

Referring to FIG. 4A, in 411, the image processing apparatus 100 generates a feature map including significant information in an input image, such as outline, luminous intensity, and object shape in the image. For example, when an input image includes RGB color channels, the image processing apparatus 100 generates a feature map including only luminous intensity and outline information by changing the input image in grayscale.

In 412, when the feature map is generated, the image processing apparatus 100 performs pixel labeling using the generated feature map. In an example, the pixel labeling is performed by assigning the same label to neighboring pixels having a similar feature in the input image.

In 413, the image processing apparatus 100 classifies the classes by areas in the image using the result of pixel labeling. The result of pixel labeling includes pixel probability distribution information for the classes by areas to be classified in the image. In an example, the image processing apparatus 100 determines that a pixel having a maximum probability for a specific area of the image in the pixel probability distribution information in which the pixels correspond to the specific area is the class of the area. In an example, the resolution of the pixel probability distribution information may be the same as the resolution of the input image and the number of channels may be the same as the number of classes of the entire areas of the image.

After the pixel labeling is performed, in 414, the image processing apparatus 100 generates a reinforced feature map using the result of pixel labeling. For example, in the pixel labeling, since the areas of the image are classified by classes, the image processing apparatus 100 can define the pixel labeling information of the image as a new feature and can generate the reinforced feature map using the first generated feature map.

For example, since the feature map generated using a plurality of convolution layers of a convolution neural network may have a resolution different from the resolution of an input image, the image processing apparatus 100 adjusts the resolution of the feature map such that the result of pixel labeling in the area classification step is the same as the resolution of the first generated feature map. In the result of pixel labeling, when neighboring pixels do not have a similar feature, different labels are assigned to the pixels to classify the classes by areas. Accordingly, the pixel labeling result may be included in the outline information of the input image and the image processing apparatus 100 can concatenate the pixel labeling result to the outline information of the generated feature map to generate a feature map in which the outline information in the input image is reinforced.

In 415, the image processing apparatus 100 can classify classes by objects using the reinforced feature map. For example, since the classes by areas are classified on the basis of features such as outline, luminous intensity, and color in the reinforced feature map, the image processing apparatus 100 generates a bounding box including the coordinate of an object in the input image using the result of area classification, classifies the classes by objects, and can correct the result thereof.

FIG. 4B illustrates an example of the image processing method of classifying areas by reflecting the object detection result in the area classification.

Referring to FIG. 4B, in 421, the image processing apparatus 100 generates a feature map including significant information in an input image, such as outline, luminous intensity, and object shape in the image. For example, when an input image includes RGB color channels, the image processing apparatus 100 generates a feature map including only luminous intensity and outline information by changing the input image in grayscale.

Referring to FIG. 4B, in 423, the image processing apparatus 100 reinforces the feature map on the basis of the classes, which are classified by objects in the image and the generated feature map. The image processing apparatus 100 defines the detected object of the image as a new feature of the image and reinforce the feature map by reflecting the new feature in the feature map.

For example, the reinforced feature map including the result of object detection includes the coordinate of the object in the image in comparison with the first generated feature map. In 424, the image processing apparatus 100 performs the pixel labeling by reflecting the result of object detection in the image. For example, the image processing apparatus 100 can define the object coordinates detected in the input image as a new feature of the image and reinforce the feature map. Here, the image processing apparatus 100 can determine different area classes by the object coordinates detected in the input image using the reinforced feature map including the object coordinates detected in the image at the time of pixel labeling.

In an example, the result of pixel labeling may be pixel probability distribution information, and the classes by objects mean different objects which are classified.

In 425, the image processing apparatus 100 classifies the classes by areas using the result of pixel labeling. The above-mentioned embodiments are examples of the image processing method, but the present disclosure is not limited thereto. In an example, the processes illustrated in FIGS. 4A and 4B can be performed simultaneously and may be different in the course of using and reinforcing the feature map depending on the performance of the system to which the image processing apparatus 100 is applied and the usage conditions thereof.

FIG. 4C illustrates another example of the object detection method using the pixel labeling result including the pixel probability distribution information in the area classification process to detect the object.

Referring to FIG. 4C, in 431, the image processing apparatus 100 can generates a feature map from an image. The feature map may be a map including significant information in an input image such as outline, luminous intensity, and object shape in an image, but the present disclosure is not limited thereto and the feature map may include all significant information necessary for classifying areas in an image and detecting an object in the image. For example, the image processing apparatus 100 can generate a feature map using a convolution neural network having a plurality of convolution layers and the generated feature map may have a lower resolution and more channels than those of the input image.

In an example, when the feature map is generated, the image processing apparatus 100 uses the feature map in the area classification step and the object detection step. In an example, the two steps of area classification and object detection may be performed in parallel, or one after the other.

In 432 and 433, the image processing apparatus 100 classifies the classes by areas of an image through the pixel labeling including a pixel probability distribution using the generated feature map. In an example, the image processing apparatus 100 classifies the classes by objects on the basis of the first generated feature map without generating a particular feature map for detecting an object.

In an example, as shown in 434, the image processing apparatus 100 can reinforce the feature map using the pixel labeling result including the pixel probability distribution information. When the resolution of the generated feature map is different from the resolution of the pixel probability distribution information, the scale of the feature map can be adjusted to be equal to the resolution of the pixel labeling result including the pixel probability distribution information. When the resolution is adjusted, the feature map can be reinforced by concatenating the pixel labeling result including the pixel probability distribution information and the feature map having a resolution adjusted.

In 435, the image processing apparatus 100 can predict a bounding box and generate a confidence score using the reinforced feature map including the pixel probability distribution information of the input image. Since the reinforced feature map includes the pixel labeling result and the pixel labeling can be performed by assigning the same label to pixels having a similar feature, a boundary between different labels may be the outline information of the input image. At this time, the image processing apparatus 100 can predict the outline information of an object using the reinforced feature map and generate a bounding box including the coordinate of the object.

In 435, when the bounding box is generated, the image processing apparatus 100 can generate a confidence score. In an example, the generated bounding box may have a rectangular shape surrounding the periphery of an object. In this case, the confidence score can be determined by performing regression analysis on the coordinates of each corner of the rectangular shape or the coordinate of a specific position in the input image and the coordinate of a specific bounding box. At this time, a correlation coefficient can be used as the confidence score.

When the confidence score is generated, the image processing apparatus 100 can determine whether to use the predicted bounding box on the basis of the confidence score. For example, in 436, the confidence score can be compared with a threshold value to determine that the predicted bounding box includes an object when the confidence score is greater than the threshold value, and it can be determined to use the predicted bounding box. In 436, when the confidence score is equal to or less than the threshold value, the image processing apparatus 100 can newly predict a bounding box from the reinforced feature map, generate a new confidence score on the basis of the newly predicted bounding box, and determine again whether to use the bounding box. In an example, the threshold value is predetermined on the basis of a predetermined criterion.

The image processing apparatus 100 may further perform a step of merging the bounding boxes. For example, when the bounding boxes determined to be used overlap each other, the overlapped bounding boxes can be merged and can be considered to be a bounding box surrounding a single object. Without assigning particular classifiers to individual objects in the merged bounding box, the classes of the individual objects can be classified using the result of pixel labeling including the pixel probability distribution information of the image on the basis of the reinforced feature map.

In 437, when the bounding box is determined, the image processing apparatus 100 can distinguish the classes of the individual objects by objects surrounded with the bounding box and detect the objects from the input image.

Figure 5:
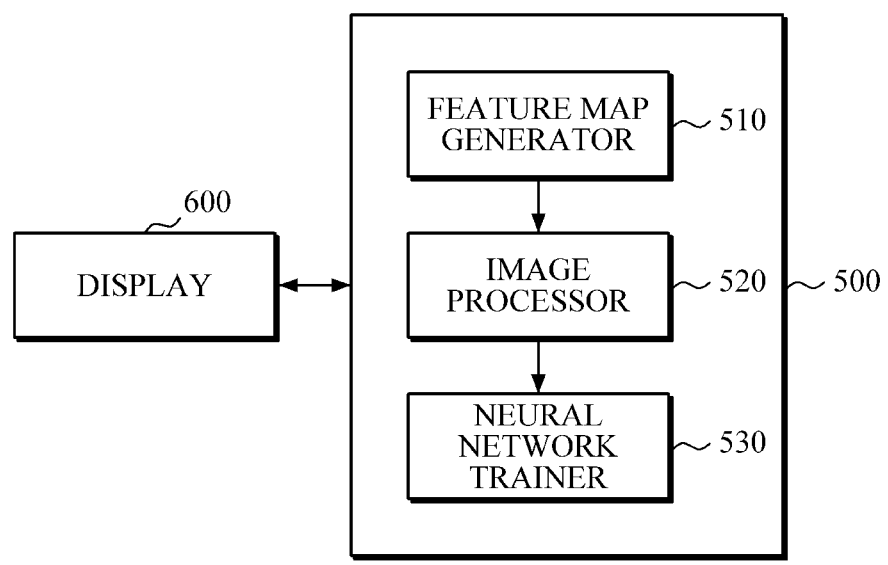
FIG. 5 is a diagram illustrating an example of a neural network learning apparatus.

FIG. 5 is a diagram illustrating an example of a neural network learning apparatus.

Referring to FIG. 5, a neural network learning apparatus 500 includes a feature map generator 510, an image processor 520, a neural network trainer 530, and a display 600. The feature map generator 510 generates a feature map of an image using a neural network. The image processor 520 performs area classification and object detection in an image using the generated feature map. The neural network trainer 530 causes the neural network to learn the area classification using the result of area classification and a first measured value and causes the neural network to learn the object detection using the result of object detection and a second measured value. The feature maps, reinforced feature maps, classified object and the classified areas/regions determined by the neural network learning apparatus 500 may be displayed in the display 600.

In an example, the display 600 may be a physical structure that includes one or more hardware components that provide the ability to render a user interface and/or receive user input. The display 600 can encompass any combination of display region, gesture capture region, a touch sensitive display, and/or a configurable area. In an example, the display 600 can be embedded in the neural network learning apparatus 500 or the image processing apparatus 100. In an example, the display 600 is an external peripheral device that may be attached to and detached from the neural network learning apparatus 500 or the image processing apparatus 100. The display 600 may be a single-screen or a multi-screen display. A single physical screen can include multiple displays that are managed as separate logical displays permitting different content to be displayed on separate displays although part of the same physical screen. The display 600 may also be implemented as an eye glass display (EGD), which includes one-eyed glass or two-eyed glasses.

The neural network learning apparatus 500 may be a neural network learning apparatus including a convolution neural network.

The feature map generator 510 generates a feature map having a lower resolution and more channels than those of an input image. For example, when a feature map is generated using the convolution neural network (CNN), a feature map having a resolution of 16 by 16 can be generated by applying a convolution layer using a 5 by 5 window in an image having a resolution of 20 by 20, and a plurality of convolution layers can be constructed in consideration of system performance or a keypoint of the input image. In an example, the size of the window in the convolution layer is adjusted.

The image processor 520 performs area classification and object detection in an image using the generated feature map The image processor 520 can perform pixel labeling on the basis of information of the feature map supplied from the feature map generator 510 to classify areas of the image. In an example, the image processor 520 receives the feature map generated by the feature map generator 510 and performs pixel labeling using deconvolution or backward convolution.

In an example, the result of pixel labeling includes pixel probability distribution information of classes to be classified. For example, the image processor 520 can determine the classes by areas on the basis of the pixel probability distribution information at the time of classifying the classes by areas of the image. That is, the image processor 520 can determine that a pixel having a maximum probability in a specific area of the image in the pixel probability distribution information, in which each pixel corresponds to the specific area is the class of the area. Here, the resolution of the pixel probability distribution information may be the same as the resolution of the input image and the number of channels thereof may be the same as the number of classes of the entire areas of the image.

In an example, the image processor 520 generates a reinforced feature map using the pixel labeling result and the feature map generated by the feature map generator 510. In an example, the reinforced feature map is displayed on the display 600. The image processor 520 adjusts the resolution of the feature map such that the pixel labeling result and the feature map generated by the feature map generator 510 have the same resolution, and concatenate both to reinforce the feature map. The area classification and the object detection based on the feature map generated by the image processor 520 can be performed in any order or both the steps may be performed in parallel. In area classification and the object detection in the image processor 520, the feature map generated by the feature map generator 510 may be used or the information on the classes by areas classified in the image or the information on the classes by objects in the image may be used to reinforce the feature map generated by the feature map generator 510.

The image processor 520 predicts a bounding box using the reinforced feature map. For example, the image processor 520 can predict the coordinate of an object using the information on the classes by areas of the reinforced feature map including the pixel probability distribution information and can generate a bounding box including the coordinate of the predicted object. The bounding box may have a rectangular shape surrounding the periphery of the predicted object, but the present disclosure is not limited thereto.

Further, the image processor 520 can determine whether to use the predicted bounding box. For example, the image processor 520 may determine whether to use the predicted bounding box by performing regression analysis on the coordinate of a specific position in the image or the coordinate of a specific bounding box and the coordinate of the predicted bounding box. The correlation of the coordinate of the specific position or the coordinate of the specific bounding box with the predicted bounding box can be determined on the basis of the result of the regression analysis. Based on the correlation, a determination can be made whether the object detection using the predicted bounding box is appropriate, and on the basis thereon, it can be determined whether to use the predicted bounding box.

For example, when the correlation coefficient determined through the regression analysis is greater than a threshold value, the image processor 520 can determine to use the predicted bounding box. In an example, the threshold value can be predetermined on the basis of a predetermined criterion. The threshold value may vary depending on the usage of the neural network learning apparatus 500. For example, when the object detection time is more important than the object detection accuracy, the threshold value may be set to be lowered to detect an object faster. When the object detection accuracy is more important, the threshold value may be set to be higher to increase the object detection accuracy using the predicted bounding box.

The coordinates of the bounding box may include the coordinates of the corners of each bounding box, but the present disclosure is not limited thereto. The coordinates of the bounding box may vary depending on the system specifications of the neural network learning apparatus 500.

When predicted bounding boxes overlap each other, the image processor 520 can merge the overlapped bounding boxes and consider the merged bounding box as a bounding box surrounding a single object. In an example, the image processor 520 uses the coordinates of the overlapped bounding boxes as the coordinates of the merged bounding box, and the classes of an object in the merged bounding box can be classified on the basis of the result of pixel labeling generated by the image processor 520 without assigning particular classifiers to the bounding boxes. When the reinforced feature map is used, the reinforced feature map may include the pixel labeling result including the pixel probability distribution information of the image and the image processor 520 may classify the classes of the individual objects in the overlapped bounding boxes using the pixel labeling result in which different labels are assigned to the individual objects in the merged bounding box.

The above-mentioned embodiment is an example according to one aspect and the present disclosure is not limited to the embodiment. For example, according to another aspect, the image processor 520 may classify areas of an image by performing the pixel labeling using the feature map generated by the feature map generator 510 and a result in which the classes by objects are classified.

The image processor 520 can generate a reinforced feature map including the coordinates of detected objects and can classify areas including the coordinates of the objects in the image as different areas of the image.

The neural network trainer 530 can train a neural network using a learning algorithm, such as, for example, a backpropagation algorithm on the basis of an area classification loss function and an object detection loss function.

For example, the neural network trainer 530 can train the neural network on the basis of the area classification loss function using the area classification result in the image processor 520 and a first measured value. The first measured value may be a ground truth pixel label value, which may vary depending on the field in which the neural network learning apparatus 500 is used and performance of a system. For example, when the neural network learning apparatus is applied to a drivable area recognition system for automatic driving, the first measured value may include data indicating drivable areas which are acquired through actual driving and which includes information such as, for example, pixel information of roads, centerlines, pedestrians, signs, and street trees.

In an example, the neural network trainer 530 trains the neural network using the pixel labeling result of the input image, the first measured value, and a backpropagation algorithm on the basis of the area classification loss function.

In an example, the neural network trainer 530 can train the neural network using the object detection result in the image processor 520 and a second measured value on the basis of the object detection loss function.

In an example, the second measured value may be a ground truth bounding box value, which may vary depending on the field in which the neural network learning apparatus 500 is used or the system performance. For example, when the neural network learning apparatus is applied to a drivable area recognition system for automatic driving, the second measured value may include data indicating drivable areas which are acquired through actual driving and may be information such as, for example, bounding box surrounding roads, centerlines, pedestrians, signs, and street trees.

The neural network trainer 530 can train the neural network using the pixel labeling result of the input image, the second measured value, and the backpropagation algorithm on the basis of the area classification loss function.

The neural network learning apparatus 500 can train the neural network in an integrated learning manner on the basis of the area specification result, the first measured value, the object detection result, and the second measured value so as to generate a feature map in which the area classification and the object detection are reflected together.

For example, when the pixel labeling is performed in an input image to classify areas, the result of pixel labeling may be data specifically indicating outline information of the input image and the object detection result may be data including coordinates of objects in the input image. The neural network learning apparatus 500 can train the neural network using a learning algorithm including the backpropagation algorithm on the basis of the area specification result, the object detection result, and the loss function data so as to generate a feature map in which the area classification result and the object detection result are reflected together.

For example, when a convolution neural network is considered and the neural network is made to learn using the backpropagation algorithm, the neural network can be made to learn convolution kernels in consideration of the area classification result and the object detection result. In an example, the learned convolution kernels can cause the neural network to learn more information, for example, intermediate results and final results of the area classification and the object detection, in comparison with a case in which the area classification and the object detection are independently performed and learned in the input image. In an example, intrinsic correlations can be reflected in the step of area classification and the step of object detection by correlating the features having a high correlation required for the area classification and the object detection such as outline, luminous intensity, and shape in the input image and training the neural network.

The neural network learning apparatus 500 can generate a feature map in consideration of the correlation between the features required for the area classification and the object detection using the neural network trained in the integrated learning manner. In an example, the generated feature map is displayed on the display 600. The feature map generated through the integrated learning reflects the correlation between the features such as outline, luminous intensity, and shape which are required for the object detection and the area specification in comparison with a feature map which is generated through the independent learning of the area classification and the object detection and it is thus possible to generate a feature map that can simultaneously perform the area classification and the object detection.

As a non-exhaustive illustration only, the image processing apparatus 100 and the neural network learning apparatus 500 may be embedded in or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein or various other Internet of Things (IoT) devices that are controlled through a network. The digital devices may be implemented in a smart appliance, an intelligent vehicle, an apparatus for automatic driving, a smart home environment, a smart building environment, a smart office environment, office automation, and a smart electronic secretary system.

The digital devices may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

Figure 6:
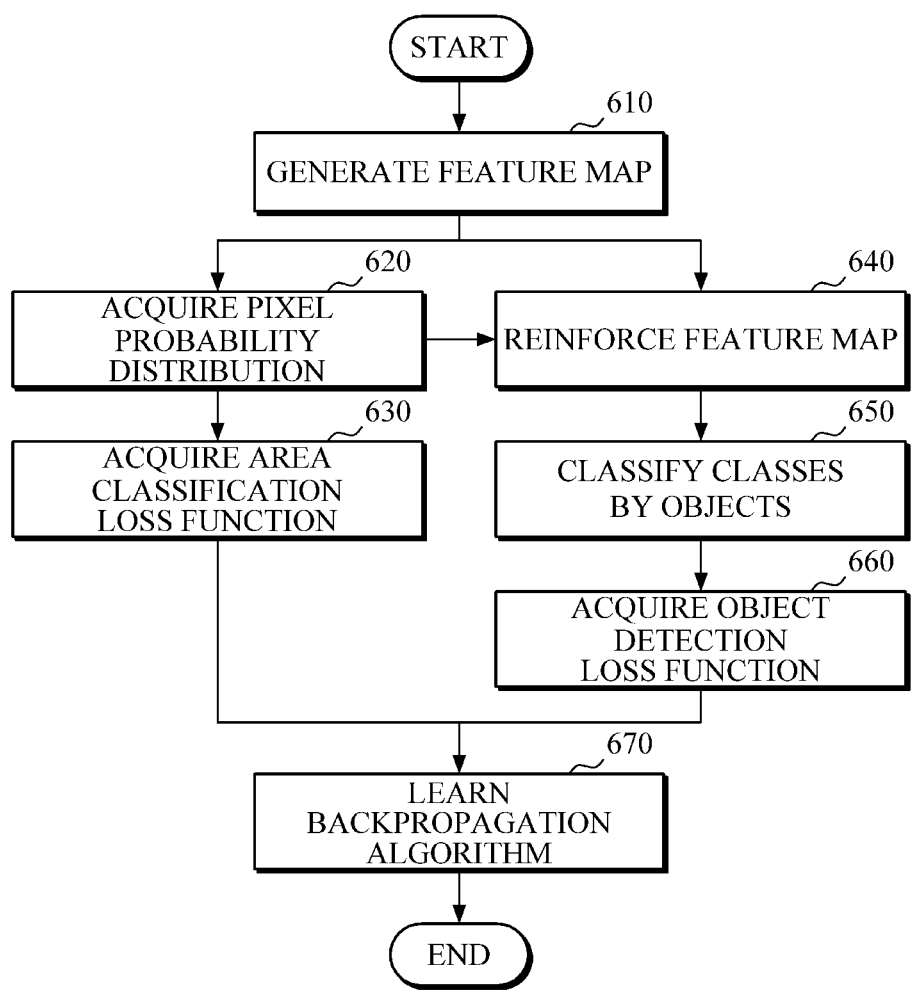
FIG. 6 is a diagram illustrating an example of a neural network learning method.

FIG. 6 is a diagram illustrating an example of a neural network learning method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. In addition to the description of FIG. 6 below, the above descriptions of FIGS. 1-5, are also applicable to FIG. 6, and are incorporated herein by reference. Thus, the above description may not be repeated here.

FIG. 6 illustrates an example of a neural network learning method, which is performed by the neural network learning apparatus 500 illustrated in FIG. 5.

In 610, the neural network learning apparatus 500 generates a feature map form an input image. At this time, the feature map may be a map including information such as, for example, color, shape, luminous intensity, and outline of the image, but the present disclosure is not limited thereto and the feature map may include all significant information required for processing the image.

In 620, when the feature map is generated, the neural network learning apparatus 500 can perform pixel labeling on the basis of the generated feature map and acquire pixel probability distribution information. For example, the pixel labeling can be performed by assigning the same label to neighboring pixels having a similar feature in the image and assigning different labels to pixels not having a similar feature. In an example, the pixel labeling result may include the pixel probability distribution information.

In 640, the neural network learning apparatus 500 adjusts the pixel labeling result from the image or the pixel labeling result including the pixel probability distribution information and the feature map to have the same resolution, and perform concatenation thereon to reinforce the feature map. For example, the neural network learning apparatus 500 reinforces the feature map by defining the pixel probability distribution information as new feature information of the image, adjusting the pixel labeling result and the first generated feature map to have the same resolution, and performing matching and concatenating by pixels.

In 650, the neural network learning apparatus 500 classifies the classes by objects of the image using the reinforced feature map. For example, the neural network learning apparatus 500 predicts the positions of the objects on the basis of the information of the classes by areas, which are classified using the reinforced feature map reflecting the pixel probability distribution information in the step of area classification and can generate bounding boxes including the predicted positions of the objects. In an example, the bounding box may have a rectangular shape surrounding the periphery of the predicted object, but the present disclosure is not limited thereto.

The neural network learning apparatus 500 can perform the step of area classification and the step of object detection in parallel using the feature map and can use intermediate results or final results of each step for the other step. For example, the neural network learning apparatus 500 can perform the pixel labeling by assigning the same label to the pixels of the area including the object coordinates using the object coordinates of the image determined in the step of object detection or the coordinates of the bounding boxes.

In an example, in 630 and 660, the neural network learning apparatus 500 defines an area classification loss function and an object detection loss function, respectively. In 670, the neural network learning apparatus 500 trains the neural network using a learning algorithm including a backpropagation algorithm on the basis of the area classification loss function and the object detection loss function.

For example, the neural network learning apparatus 500 trains the neural network on the basis of the area classification loss function using the area classification result of the image and a first measured value (630). In an example, the first measured value may be a ground truth pixel label value, which may vary depending on the field in which the neural network learning apparatus 500 is used and performance of a system. For example, when the neural network learning apparatus is applied to a drivable area recognition system for automatic driving, the first measured value may include data indicating drivable areas which are acquired through actual driving and which includes information such as, for example, pixel information of roads, centerlines, pedestrians, signs, and street trees.

The neural network learning apparatus 500 compares the pixel labeling result with the first measured value and train the neural network using a learning algorithm including a backpropagation algorithm on the basis of the resultant loss resulting from the comparison. The neural network learning apparatus 500 can gradually reduce the loss through this learning and can gradually reduce an error between the first measured value and the pixel labeling result.

Then, the neural network learning apparatus 500 can train the neural network using the object detection result and a second measured value on the basis of the object detection loss function.

The second measured value may be a ground truth bounding box value, which may vary depending on the field in which the neural network learning apparatus 500 is used or the system performance. For example, when the neural network learning apparatus is applied to a drivable area recognition system for automatic driving, the second measured value may include data indicating drivable areas which are acquired through actual driving and may be a data such as, for example, bounding box surrounding roads, centerlines, pedestrians, signs, and street trees.

Then, the neural network learning apparatus 500 can train the neural network using a learning algorithm including a backpropagation algorithm on the basis of the result of object detection and the second measured value. The neural network learning apparatus 500 can gradually reduce the loss through this learning and can gradually reduce an error between the second measured value and the object detection result. The feature map generated by the In an example, the neural network learning apparatus 500 trains the neural network in an integrated learning manner on the basis of the area specification result, the first measured value, the object detection result, and the second measured value so as to generate a feature map in which the area classification and the object detection are reflected together.

The image processing apparatus 100, feature map generator 110, image processor 120, area classifier 121, object detector 122, neural network learning apparatus 500, feature map generator 510, image processor 520, neural network trainer 530, and a display 600 described in FIGS. 1, 2, and 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 4A-4C, and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for image processing, the apparatus comprising:
one or more processors configured to:
generate a feature map for an image using a trained machine learning model;
perform pixel labeling for the image by segmenting the generated feature map;
classify one or more areas of the image based on a result of the pixel labeling;
generate plural bounding boxes for the image using a reinforced feature map,
wherein the reinforced feature map is generated based on the result of the pixel labeling and the feature map, wherein coordinates of the plural bounding boxes are determined based on coordinates of the one or more classified areas, and wherein the generating of the plural bounding boxes includes merging at least portions of the plural bounding boxes in response to the at least portions of the plural bounding boxes overlapping to each other; and
detect one or more objects of the image in response to a confidence score of the plural bounding boxes being greater than a threshold.

2. The apparatus of claim 1, wherein the trained machine learning model is a neural network.

3. The apparatus of claim 2, wherein the neural network comprises a convolution neural network.

4. The apparatus of claim 1, wherein, for the classifying of the one or more areas and the detecting of the one or more objects, the one or more processors are configured to classify the one or more areas and detect the one or more objects using the feature map and the result of the pixel labeling.

5. The apparatus of claim 4, wherein for the classifying of the one or more areas and the detecting of the one or more objects, the one or more processors are configured to use an intermediated result or a final result of the classifying of the one or more areas to detect the one or more objects or, to use an intermediated result or a final result of the detecting of the one or more objects to classify the one or more areas.

6. The apparatus of claim 4, wherein the result of the pixel labeling comprises pixel probability distribution information including probabilities that area classes correspond to a pixel of the image.

7. The apparatus according to claim 6, wherein the one or more processors are configured to classify the one or more areas using a class having a maximum probability for each pixel in the pixel probability distribution information.

8. The apparatus of claim 1, wherein the one or more processors are configured to:
for the pixel labeling, generate the result of the pixel labeling in one or more deconvolutional stages.

9. The apparatus of claim 1, wherein the feature map of the image comprises information indicating any one or any combination of any two or more of a color of the input image, a shape of the input image, an area of the input image, an outline of the input image, and a luminous intensity of the input image.

10. A processor-implemented method, the method comprising:
generating a feature map for an image using a trained machine learning model;
perform pixel labeling for the image by segmenting the generated feature map;
classifying one or more areas of the image based on a result of the pixel labeling;
generating plural bounding boxes for the image using a reinforced feature map,
wherein the reinforced feature map is generated based on the result of the pixel labeling and the feature map, wherein coordinates of the plural bounding boxes are determined based on coordinates of the one or more classified areas, and wherein the generating of the plural bounding boxes includes merging at least portions of the plural bounding boxes in response to the at least portions of the plural bounding boxes overlapping to each other; and
detecting one or more objects of the image in response to a confidence score of the plural bounding boxes being greater than a threshold.

11. The method of claim 10, wherein the trained machine learning model is a neural network.

12. The apparatus of claim 11, wherein the neural network comprises a convolution neural network.

13. The method of claim 10, wherein the classifying of the one or more areas and the detecting of the one or more objects comprises:
classifying the one or more areas and detect the one or more objects using the feature map and the result of the pixel labeling.

14. The method of claim 13, wherein the classifying of the one or more areas and the detecting of the one or more objects comprises: using an intermediated result or a final result of the classifying of the one or more areas to detect the one or more objects or, using an intermediated result or a final result of the detecting of the one or more objects to classify the one or more areas.

15. The method of claim 13, wherein the result of the pixel labeling comprises pixel probability distribution information including probabilities that area classes correspond to a pixel of the image.

16. The method according to claim 15, wherein the classifying the one or more areas comprises using a class having a maximum probability for each pixel in the pixel probability distribution information.

17. The method of claim 10, wherein the pixel labeling comprises generating the result of the pixel labeling in one or more deconvolutional stages.

18. A non-transitory computer-readable storage medium storing instructions that, when executed by one or more processors, configure the one or more processors to perform the method of claim 10.

\* \* \* \* \*